United States Patent
Park et al.

(10) Patent No.: US 8,835,030 B2
(45) Date of Patent: Sep. 16, 2014

(54) BATTERY PACK

(71) Applicants: Seok-Ryun Park, Yongin-si (KR); Seok Koh, Yongin-si (KR)

(72) Inventors: Seok-Ryun Park, Yongin-si (KR); Seok Koh, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 0 days.

(21) Appl. No.: 13/645,810

(22) Filed: Oct. 5, 2012

(65) Prior Publication Data

US 2013/0202916 A1    Aug. 8, 2013

(30) Foreign Application Priority Data

Feb. 3, 2012 (KR) .......................... 10-2012-0011173

(51) Int. Cl.
*H01M 2/00*    (2006.01)

(52) U.S. Cl.
USPC ................... 429/61; 429/7; 429/62; 429/156; 429/9; 361/106

(58) Field of Classification Search
None
See application file for complete search history.

(56) References Cited

U.S. PATENT DOCUMENTS

| 7,862,919 | B2 * | 1/2011 | Kim et al. ........................ 429/9 |
| 2002/0182481 | A1 * | 12/2002 | Ehara .............................. 429/62 |
| 2010/0173179 | A1 * | 7/2010 | Matthias ........................... 429/7 |
| 2010/0214707 | A1 | 8/2010 | Yun |

FOREIGN PATENT DOCUMENTS

| JP | 2010-067536 | 3/2010 |
| KR | 1991-0002066 | 1/1991 |
| KR | 10-2010-0096391 | 9/2010 |

* cited by examiner

*Primary Examiner* — Milton I Cano
*Assistant Examiner* — Carmen Lyles-Irving
(74) *Attorney, Agent, or Firm* — Lee & Morse, P.C.

(57) ABSTRACT

A battery pack includes a first bare cell and a second bare cell having positive electrodes electrically connected to each other at a first node and negative electrodes electrically connected to each other at the second node, a first protective device connected between the positive electrode of the first bare cell and the first node, and a protective circuit module electrically connected between the first bare cell and second bare cell.

20 Claims, 2 Drawing Sheets

BATTERY PACK

CROSS-REFERENCE TO RELATED APPLICATIONS

This application claims the benefit of Korean Patent Application No. 10-2012-0011173, filed on Feb. 3, 2012, in the Korean Intellectual Property Office, and entitled: "Battery Pack," is incorporated by reference herein in its entirety.

BACKGROUND

1. Field

Embodiments relate to a battery pack.

2. Description of the Related Art

Recently, compact and lightweight portable electronic/electric devices such as cellular phones, laptops, camcorders, or the like, have been actively developed and produced. The portable electronic/electric devices may include a battery pack so as to be operated even in the places where a separate power supply is not provided.

An example of the battery pack may include a rechargeable secondary battery pack including a nickel-cadmium (Ni—Cd) battery, a nickel-metal hydride (Ni-Mh) battery or a lithium battery, considering economic aspects. Among these battery packs, a battery pack using a lithium secondary battery has been commonly used, since a lithium secondary battery has an operating voltage that is three times higher and has a higher energy density per unit weight, as compared to the nickel-cadmium battery or nickel-metal hydride battery.

SUMMARY

According to an embodiment, there is provided a battery pack, including a first bare cell and a second bare cell having positive electrodes electrically connected to each other at a first node and negative electrodes electrically connected to each other at a second node, a first protective device connected between the cathode terminal of the first bare cell and the first node, a protective circuit module electrically connected between the first bare cell and the second bare cell. The first protective device may be a positive temperature coefficient (PTC) device.

The battery pack may further include a second protective device between the negative electrode of the first bare cell and the second node. The second protective device may be a PTC device. The battery pack may further include a third protective device connected between the negative electrode of the second bare cell and the second node. The third protective device may be a PTC device.

The battery pack may further include a fourth protective device connected between the first node or the second node and the protective circuit module. The fourth protective device may be a PTC device The protective circuit module may be electrically connected to the first node and the second node.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
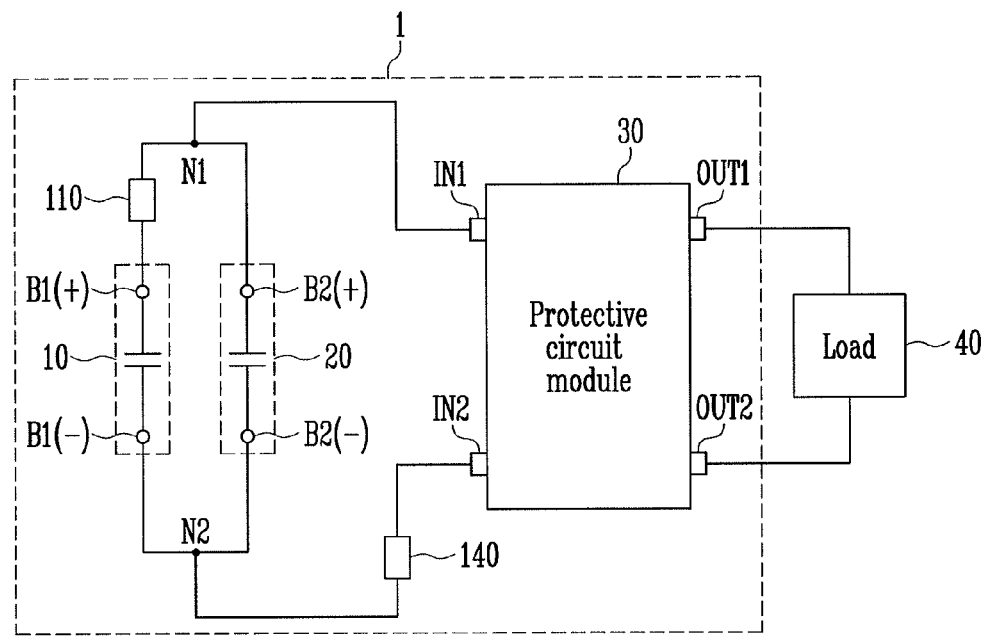
FIG. 1 illustrates a diagram showing a battery pack according to an embodiment.

Example embodiments will now be described more fully hereinafter with reference to the accompanying drawings; however, they may be embodied in different forms and should not be construed as being limited to the embodiments set forth herein. Rather, these embodiments are provided so that this disclosure will be thorough and complete and will fully convey the scope thereof to those skilled in the art.

In the drawing figures, the dimensions of layers and regions may be exaggerated for clarity of illustration. It is to be understood that, unless otherwise indicated, when an element is referred to as being "connected" or "electrically connected" to another element, it may be directly connected, or intervening elements may be present. Like reference numerals refer to like elements throughout.

In addition, in the accompanying drawings, portions unrelated to the embodiments will be omitted, and similar reference numerals will be used to describe similar portions throughout the present specification.

Hereinafter, a battery pack according to exemplary embodiments will be described with reference to and the accompanying drawings. FIG. 1 is a diagram showing a battery pack according to an embodiment.

Referring to FIG. 1, a battery pack 1 according to the exemplary embodiment includes a first bare cell 10, a second bare cell 20, a protective circuit module 30, and a first protective device 110.

The first bare cell 10 and second bare cell 20 are connected to each other in parallel. Each bare cell 10 and 20 may be a can-type battery, in which an electrode assembly, which is a power generation source, is included within a can, or may be a pouch-type battery, in which the electrode assembly is sealed within a pouch.

The first bare cell 10 includes a positive electrode B1(+) and an negative electrode B1(−). The second bare cell 20 also includes a positive electrode B2(+) and an negative electrode B2(−).

The first bare cell 10 and the second bare cell 20 may be connected to each other in parallel, such that the positive electrode B1(+) of the first bare cell 10 is electrically connected with the positive electrode B2(+) of the second bare cell 20 at a first node, and the negative electrode B1(−) of the first bare cell 10 is electrically connected with the negative electrode B2(−) of the second bare cell 20 at a second node N2.

The protective circuit module 30 performs a role of protecting each bare cell 10 and 20 from an overdischarge, an overcharge, an overcurrent state, or the like, in order to secure the safety of the battery pack 1

To this end, the protective circuit module 30 may be electrically connected with the first bare cell 10 and second bare cell 20, which are connected to each other in parallel.

Specifically, the positive electrodes B1(+) and B2(+) of the respective bare cells 10 and 20 may be connected to a first input end IN1 of the protective circuit module 30, and the negative electrodes B1(−) and B2(−) of the respective bare cells 10 and 20 may be connected to a second input end IN2 of the protective circuit module 30.

In addition, the protective circuit module 30 may transfer a voltage output from bare cells 10 and 20 to a load 40 through a first output end OUT1 and a second output end OUT2.

A fourth protective device 140 (in addition to the first protective device 110 described above and the second and/or third protective devices 120, 130 discussed below with respect to the embodiments illustrated in FIGS. 2 and 3) may be installed between the protective circuit module 30 and the bare cells 10 and 20 in order to protect the battery pack 1 from an abnormal current or abnormal temperature outside thereof.

Although FIG. 1 shows the fourth protective device 140 connected between the second input end IN2 of the protective circuit module 30 and the second node N2, in other implementations, the fourth protective device 140 may be connected between the first input end IN1 of the protective circuit module 30 and the first node N1.

Although FIG. 1 shows the case in which the fourth protective device 140 is separately disposed from the protective circuit module 30, in other implementations, the protective device 140 may be configured so as to be included inside the protective circuit module 30. The fourth protective device 140 may also be included in the embodiments illustrated in FIGS. 2 and 3, described below.

With a battery pack 1 including only the fourth protective device 140, it may be difficult to protect each bare cell 10 and 20 from an abnormal current or an abnormal temperature that may occur inside one of the bare cells 10 or 20.

For example, if an abnormal current occurs in the first bare cell 10 due to a short or the like, the abnormal current may affect the second bare cell 20, which is connected with the first bare cell 10 in parallel, which may lead to an abnormality with respect to the second bare cell 20.

In addition, when the first bare cell 10 is in an abnormal condition, the fourth protective device 140 may block a large current, even though the driving is provided by the second bare cell 20, such that the power supply to the load 40 may be blocked.

Accordingly, in the embodiment \illustrated in FIG. 1 described above, the first protective device 110 may be additionally connected between the first node and the positive electrode B1(+) of the first bare cell 10.

Thus, when the first bare cell 10 is in an abnormal condition, the first protective device 110 may be operated to electrically isolate the first bare cell 10, thereby making it possible to protect the second bare cell 20 adjacent thereto from being damaged.

The first protective device 110 may block a flow of overcurrent that exceeds a predetermined reference value. A fuse, or the like, may be used as the first protective device 110. The first protective device 110 may be in continuous use. Accordingly, the first protective device may be implemented as a positive temperature coefficient (PTC) device. The PTC device may control current by varying its resistance according to an internal temperature of the battery pack. For example, the internal resistance of the PTC device may increase with an increase in temperature, which may cause the current to be blocked or decreased. When the temperature decreases again, the internal resistance of the PTC device decreases, such that current normally flows.

The configuration and features of the first protective device 110 may also be applied to other protective devices 120, 130, and 140, and therefore, a description thereof will not be repeated.

Figure 2:
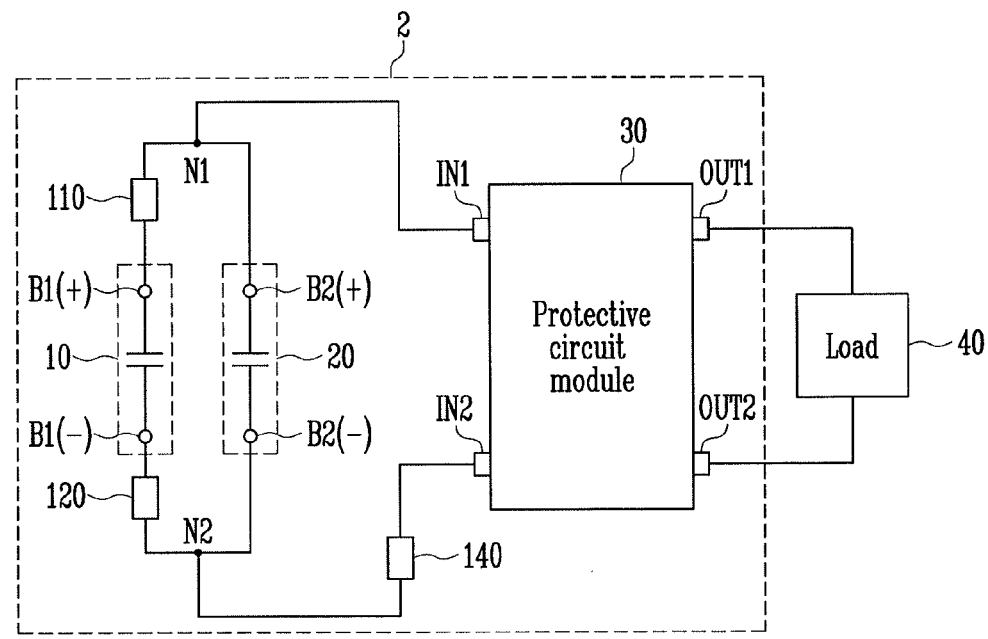
FIG. 2 illustrates a diagram showing a battery pack according to another embodiment.

FIG. 2 is a diagram showing a battery pack 2 according to another embodiment.

In the case of the embodiment illustrated in FIG. 1, the protective device 110 exists only in the positive electrode B1(+) of the first bare cell 10, such that the second bare cell 20 may be affected through the negative electrode B1(−) when the first bare cell 10 is in an abnormal condition.

Therefore, as shown in FIG. 2, the battery pack 2 according to another embodiment may further include a second protective device 120 connected between the negative electrode B1(−) of the first bare cell 10 and the second node N2.

Therefore, even when the first bare cell 10 is in an abnormal condition, the negative electrode B1(−) of the first bare cell 10 may be electrically isolated from the second bare cell 20.

The present description mainly relates to aspects that are different from those of the above-mentioned embodiment illustrated in FIG. 1. Other aspects may be the same as those of the above-mentioned embodiment.

Figure 3:
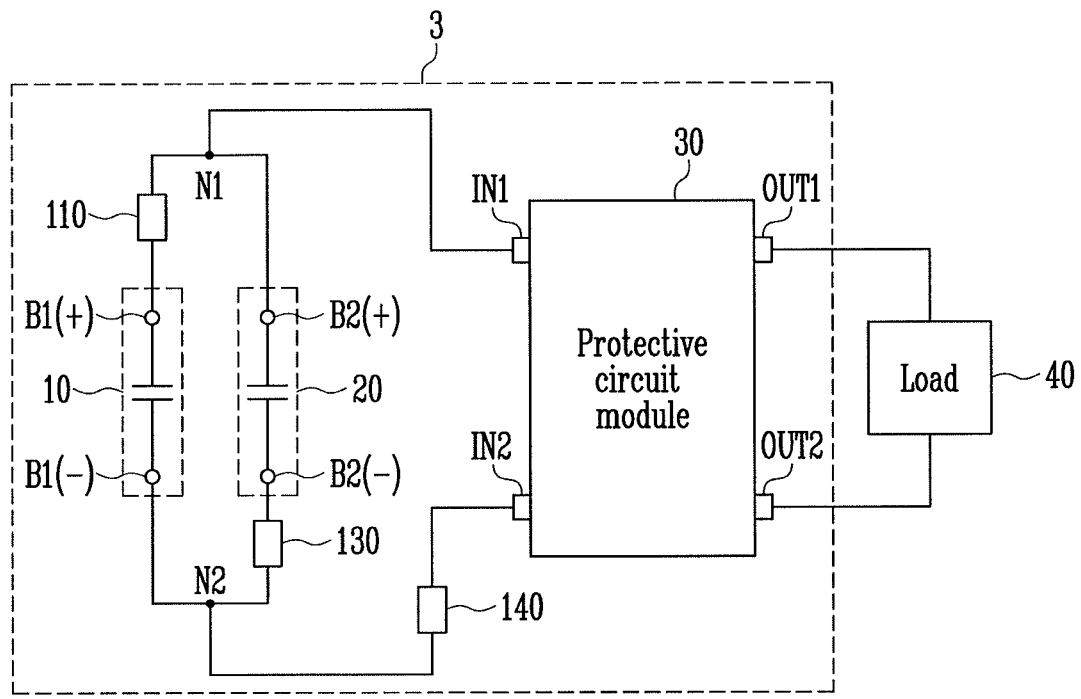
FIG. 3 illustrates a diagram showing a battery pack according to another embodiment.

FIG. 3 is a diagram showing a battery pack 3 according to another embodiment.

In the case of the exemplary embodiment illustrated in FIG. 2, the protective devices 110 and 120 are installed only at the first bare cell 10. This configuration may lead to a difference in impedance between the first bare cell 10 and the second bare cell 20. As a result, a cycle life of each bare cell 10 and 20 may be worsened.

Therefore, referring to FIG. 3, the battery pack 3 according to the embodiment illustrated in FIG. 3 may include a third protective device 130 connected between the negative electrode B2(−) of the second bare cell 20 and the second node N2, instead of between the negative electrode B1(−) of the first bare cell 10 and the second node N2 as in the exemplary embodiment illustrated in FIG. 2. Therefore, the impedance of the first bare cell 10 and the second bare cell 20 may be set to be approximately the same. In addition, when an abnormality occurs in the second bare cell 20 rather than in the first bare cell 10, the third protective device 130 operates to electrically isolate the second bare cell 20 from the first bare cell 10, thereby preventing the first bare cell 10 adjacent thereto 10 from being damaged.

The present description mainly describes aspects that are different from those of the above-mentioned embodiments. Other aspects may be the same as those of the above-mentioned embodiment illustrated in FIG. 1.

Figure 4:
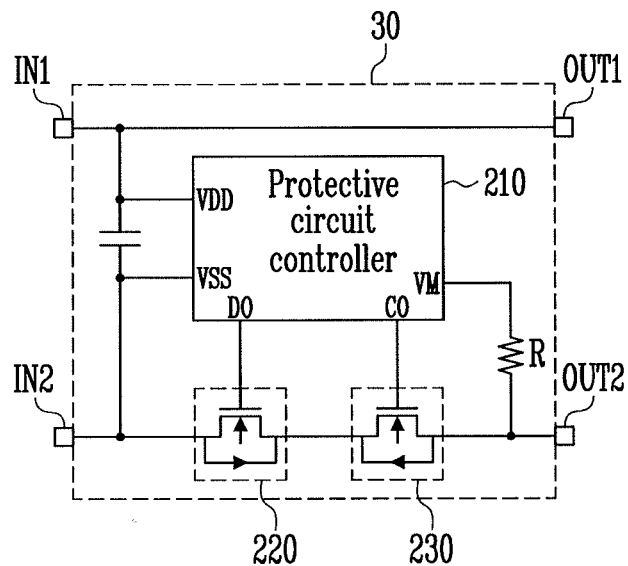
FIG. 4 illustrates a diagram showing a protective circuit module according to an embodiment.

FIG. 4 is a diagram showing a protection circuit module according to an exemplary embodiment.

Referring to FIG. 4, the protective circuit module 30 may include a power end VDD, a ground end VSS, an overdischarge-blocking signal output end DO to output an overcurrent and overdischarge blocking signal, a charge blocking signal output end CO to output an overcharge blocking signal, and a protective circuit controller 210. When an overcurrent is sensed through the overcurrent sensing end VM, the protective circuit controller 210 outputs a control signal to block the discharge.

The protective circuit module 30 may include a first field effect transistor (FET) 220, which is a switching device for discharging, to block the discharging of the battery pack by operating according to an overdischarge-blocking signal of the protective circuit controller 210, and a second FET 230, which is a switching device for charging, to block the charging of the battery pack by operating according to an overcharge-blocking signal. The protective circuit module 30 may further include a resistance R in order to prevent a reverse current from flowing into a controller 210 when the reverse power is applied there.

The first FET 220, which is a switching device for discharging, and the second FET 230, which is a switching device for charging, may be formed as N-MOS transistors or P-MOS transistors. A parasitic diode may be connected in parallel to the source terminal and drain terminal of the first FET 220 and the second FET 230. The power supply may flow through the parasitic diode during charging or discharging when either the first FET 220 or the second FET 230 is turned off.

The configuration of the protective circuit module 30 described above is just an example. In other implementations, other configurations of the protective circuit module 30 may be used.

By way of summation and review, a battery pack may present a high risk of fire due to ignition, rupture, or explosion under a condition in which an overcurrent state occurs from an overcharge, an overdischarge, a short between terminals, and the like, in consideration of the chemical characteristics of the battery.

In order to prevent such a risk, the desirability for providing a protective device which blocks abnormal current inside the battery pack has increased. According to present embodiments, a battery pack is provided that may prevent damage to a bare cell that is connected to in parallel to another bare cell that becomes abnormal.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A battery pack, comprising:
    a first bare cell and a second bare cell;
    a first node and a second node connecting the first bare cell and the second bare cell in parallel;
    a protective circuit module electrically connected with both the first and second bare cells, between the first node and the second node, including a first input end and a second input end, and protecting the first and second bare cells from an overdischarge, an overcharge, an overcurrent state, a short, or any combination thereof; and
    a first protective device between the first bare cell and the first node;
    wherein the first node is between the two bare cells and the first input end, and the second node is between the two bare cells and the second input end.

2. The battery pack as claimed in claim 1, wherein the first protective device is a positive temperature coefficient (PTC) device.

3. The battery pack as claimed in claim 1, further comprising a second protective device between the first bare cell and the second node.

4. The battery pack as claimed in claim 3, wherein the second protective device is a PTC device.

5. The battery pack as claimed in claim 1, further comprising a third protective device connected between the second bare cell and the second node.

6. The battery pack as claimed in claim 5, wherein the third protective device is a PTC device.

7. The battery pack as claimed in claim 1, further comprising a fourth protective device connected between the first node and the first input end, or between the second node and the second input end of the protective circuit module.

8. The battery pack as claimed in claim 3, further comprising a fourth protective device connected between the first node and the first input end, or, between the second node the second input end of and the protective circuit module.

9. The battery pack as claimed in claim 5, further comprising a fourth protective device connected between the first node and the first input end, or between the second node and the second input end of the protective circuit module.

10. The battery pack as claimed in claim 7, wherein the fourth protective device is a PTC device.

11. The battery pack as claimed in claim 1, wherein the protective circuit module is electrically connected to the first node and the second node.

12. The battery pack as claimed in claim 1, wherein the first protective device is connected in series with the first bare cell, both the first protective device and the first bare cell being connected in parallel to the second bare cell.

13. The battery pack as claimed in claim 1, wherein the first protective device is directly electrically connected to the first bare cell.

14. The battery pack as claimed in claim 13, wherein the protective circuit module is electrically connected to the first and second nodes.

15. The battery pack as claimed in claim 1, wherein the protective circuit module includes a protective circuit controller.

16. The battery pack as claimed in claim 15, wherein the protective circuit module has a power end (VDD), a ground end (VSS), an overdischarge-blocking signal output end (DO) configured to output an overcurrent and overdischarge blocking signal, and a charge blocking signal output end (CO) configured to output an overcharge blocking signal.

17. The battery pack as claimed in claim 16, wherein if an overcurrent is sensed through the overcurrent sensing end VM, the protective circuit controller outputs a control signal to block the discharge.

18. The battery pack as claimed in claim 16, wherein the protective circuit module further includes
    a first field effect transistor (FET) configured as a switching device for discharging and to block the discharging of the battery pack by operating according to an overdischarge-blocking signal of the protective circuit controller, and
    a second FET configured as a switching device for charging and to block the charging of the battery pack by operating according to an overcharge-blocking signal of the protective circuit controller.

19. The battery pack as claimed in claim 18, wherein the protective circuit module further includes a parasitic diode connected in parallel to source terminals and drain terminals of the first and second FETs, configured so that a power supply can flow through the parasitic diode during charging or discharging when either the first or second FET is turned off.

20. The battery pack as claimed in claim 15, wherein the protective circuit module further includes a resistance configured to prevent a reverse current from flowing into the protective circuit controller when a reverse power is applied.

* * * * *